United States Patent
Watanabe

(10) Patent No.: US 6,247,567 B1
(45) Date of Patent: Jun. 19, 2001

(54) FLUID CLUTCH

(75) Inventor: Toshikazu Watanabe, Shizuoka Prefecture (JP)

(73) Assignee: Usui Kokusai Sangyo Kaisha Limited (JP)

(*) Notice: Subject to any disclaimer, the term of this patent is extended or adjusted under 35 U.S.C. 154(b) by 0 days.

(21) Appl. No.: 09/475,509

(22) Filed: Dec. 30, 1999

(51) Int. Cl.$^7$ .................................................. F16D 35/02
(52) U.S. Cl. .................................. 192/58.43; 192/58.681
(58) Field of Search .............................. 192/58.43, 58.6, 192/58.63, 58.681, 58.5

(56) References Cited

U.S. PATENT DOCUMENTS

| | | |
|---|---|---|
| 2,879,755 | 3/1959 | Weir . |
| 2,988,188 | 6/1961 | Tauschek . |
| 3,059,745 | 10/1962 | Tauschek . |
| 3,217,849 | 11/1965 | Weir . |
| 3,259,221 | 7/1966 | Godfrey . |
| 3,272,188 | 9/1966 | Sabat . |
| 3,430,743 | 3/1969 | Fujita et al. . |
| 3,463,282 | 8/1969 | Fujita et al. . |
| 3,642,105 | 2/1972 | Kikuchi . |
| 3,727,354 | 4/1973 | La Flame . |
| 3,840,101 | 10/1974 | Peter et al. . |
| 3,856,122 | 12/1974 | Leichliter . |
| 3,893,555 | 7/1975 | Elmer . |
| 3,964,582 | 6/1976 | Mitchell . |
| 4,238,016 | 12/1980 | Yoshida et al. . |
| 4,281,750 | 8/1981 | Clancey . |
| 4,403,684 | 9/1983 | Haeck . |
| 4,505,367 | 3/1985 | Martin . |
| 4,629,046 | 12/1986 | Martin . |
| 4,665,694 | 5/1987 | Brunken . |
| 4,667,791 | 5/1987 | Martin et al. . |
| 4,685,549 | 8/1987 | Brunken et al. . |
| 4,699,258 | 10/1987 | Johnston et al. . |
| 4,796,571 | 1/1989 | Ono et al. . |
| 4,846,331 | 7/1989 | Ono . |
| 4,850,465 | 7/1989 | Ono . |
| 4,903,643 | 2/1990 | Takikawa et al. . |

(List continued on next page.)

FOREIGN PATENT DOCUMENTS

| | | |
|---|---|---|
| 54-25581 | 8/1979 | (JP) . |
| 55-76226 | 6/1980 | (JP) . |
| 57-1829 | 1/1982 | (JP) . |
| 57-167533 | 10/1982 | (JP) . |
| 57-179431 | 11/1982 | (JP) . |
| 59-27452 | 7/1984 | (JP) . |
| 62-124330 | 6/1987 | (JP) . |
| 62-194038 | 8/1987 | (JP) . |
| 63-182332 | 11/1988 | (JP) . |

Primary Examiner—Charles A. Marmor
Assistant Examiner—Saúl Rodriguez
(74) Attorney, Agent, or Firm—Anthony J. Casella; Gerald E. Hespos; Michael J. Porco

(57) ABSTRACT

The present invention provides a fluid clutch which can prevent the occurrence of 'a drag phenomenon' in various conditions so that a fan noise can be reduced and the reduction of fuel expense is enhanced.

In a fluid clutch where a rotary shaft is driven by a driving part and a driving disc rotatably driven is disposed in the inside of a sealed case which is rotatable on the rotary shaft, and by oil supplied to the inside of a torque transmitting chamber, a driving torque of the driving disc is transmitted to the sealed case, the improvement is characterized in that, in the inside of the torque transmitting chamber, the fluid clutch includes a movable disc which faces the driving disc also disposed in the inside of the torque transmitting chamber with a gap therebetween, and the gap between the driving disc and the movable disc is varied by the electromagnet which is disposed outside of the movable disc side of the sealed case, and the gap is controlled in response to the various control signals and hence, the rotational speed of a fan is controlled by varying the output torque.

13 Claims, 3 Drawing Sheets

U.S. PATENT DOCUMENTS

| | | |
|---|---|---|
| 4,903,850 | 2/1990 | Ono . |
| 4,930,458 | 6/1990 | Takikawa et al. . |
| 5,004,085 | 4/1991 | Taureg . |
| 5,018,612 | 5/1991 | Takikawa et al. . |
| 5,060,774 | 10/1991 | Takikawa et al. . |
| 5,090,533 | 2/1992 | Inoue . |
| 5,101,949 | 4/1992 | Takikawa et al. . |
| 5,109,965 | 5/1992 | Inoue . |
| 5,119,920 | 6/1992 | Inoue . |
| 5,125,491 | 6/1992 | Takikawa et al. . |
| 5,139,125 | 8/1992 | Takikawa et al. . |
| 5,232,074 | 8/1993 | Watanabe . |
| 5,452,782 | 9/1995 | Inoue . |
| 5,501,183 | 3/1996 | Takayama . |
| 5,575,368 | 11/1996 | Kikuchi et al. . |
| 5,794,749 | 8/1998 | Ryuu . |
| 5,881,857 | 3/1999 | Ryuu . |
| 5,893,441 * | 4/1999 | Reeb .................................. 192/58.43 |

* cited by examiner

FLUID CLUTCH

BACKGROUND OF THE INVENTION

1. Field of the Invention

This invention relates to a fluid clutch provided with a function of automatically controlling the operation of a cooling fan applied mainly to an internal combustion engine of a vehicle in response to an ambient temperature condition.

2. Description of the Prior Arts

As a fluid clutch for controlling the rotation of a cooling fan of an internal combustion engine of a vehicle, a type of fluid clutch which transmits a driving torque of a driving disc to a case by oil supplied to a torque transmitting chamber has been typically used. As the structure of such a fluid clutch, for example, a constitution of a coupling device (fluid clutch) where the inside of a sealed case is divided into the torque transmitting chamber and an oil reserving chamber by means of a partition plate, the driving disc which is driven by a driving part is rotatably disposed in the inside of the torque transmitting chamber, oil in the oil reserving chamber is supplied to the torque transmitting chamber through a flow-out adjusting hole formed in the partition plate, and oil in the torque transmitting chamber is returned to the oil reserving chamber through a circulation passage has been known (see Japanese publication SHO 63-21048). In this type of fluid clutch, the driving torque of the driving disc is transmitted to the sealed case by oil supplied to the torque transmitting chamber from the oil reserving chamber, a fan mounted on the sealed case is rotated so that the cooling of an engine of a automobile is performed, for example. Furthermore, in this type of fluid clutch, an ambient temperature is detected by a bimetal and in response to the elevation of the detected temperature, the degree of opening of the flow-out adjusting hole is increased. Accordingly, an amount of oil in the inside of the torque transmitting chamber is increased so that the rotational speed of the sealed case is increased and the fan is rotated at a high speed thus enhancing the cooling effect.

This type of fluid clutch, however, has following problems.

That is, under the condition that a large amount of oil is present or filled in the inside of the torque transmitting chamber, at the time of restarting the engine or at the time of rapid acceleration during the operation, following the acceleration of the driving disc of the driving side, the rotation of the case of the driven side (cooling fan) is also rapidly increased due to a large amount of oil present in the inside of the torque transmitting chamber, although for a short time. This phenomenon is generally called 'a drag phenomenon' or 'an attendingly rotating phenomenon' and gives rises to a noise of fan and an accompanying discomfort and deteriorates the fuel expense.

'The drag phenomenon' of the conventional fluid clutch which occurs at the time of restarting the engine becomes more apparent corresponding to the increase of an amount of oil in the inside of the torque transmitting chamber. As means for solving this problem, for example, Japanese publication SHO 63-21048 proposes means where oil flowed out through the flow-out adjusting hole of the partition plate is first introduced to the opposite side in the diametral direction and then is supplied to the inside of the torque transmitting chamber.

With such a structure, under the condition that substantially no oil is present in the torque transmitting chamber and a large amount of oil is present in the oil reserving chamber, even when the engine is stopped, the inflow of oil from the oil reserving chamber to the torque transmitting chamber can be prevented and hence, no 'drag phenomenon' occurs at the time of restarting the engine. However, under the condition that a large amount of oil is present in the inside of the torque transmitting chamber, the structure is not effective for the prevention of 'the drag phenomenon' at the time of restarting after the engine is stopped and at the time of rapid acceleration during the operation.

SUMMARY OF THE INVENTION

Accordingly, it is an object of the present invention to provide a fluid clutch which can prevent the occurrence of 'the drag phenomenon' in the above-mentioned various conditions, can reduce the noise of the fan and can enhance the reduction of the fuel expense.

The present invention is directed to a fluid clutch where in the inside of a torque transmitting chamber, a gap between a driving disc and an inner wall of the chamber can be varied, and the gap is controlled in response to various control signals from a computer mounted on a vehicle and hence, the rotational speed of a fan is controlled by changing an output torque. According to the first aspect of the present invention, in the fluid clutch including a driving part, a rotary shaft rotated by the driving part, a driving disc rotatably driven by the rotary shaft, a sealed case accommodating the driving disc and disposed rotatably on the rotary shaft, and a torque transmitting chamber formed in the sealed case and incorporating the driving disc therein, wherein a driving torque of the driving disc is transmitted to the sealed case by oil supplied to the inside of the torque transmitting chamber, the improvement is characterized in that in the inside of the torque transmitting chamber, a movable disc which faces the driving disc disposed in the inside of the torque transmitting chamber with a gap therebetween is resiliently supported in such a manner that the gap can be varied, an electromagnet which is disposed at a position outside of the movable disc side of the sealed case where the electromagnet faces the movable disc and attracts the movable disc is supported on the rotary shaft, whereby the gap between the driving disc and movable disc is varied by the electromagnet. According to the second aspect of the present invention, in the fluid clutch including a driving part, a rotary shaft rotated by the driving part, a driving disc rotatably driven by the rotary shaft, a sealed case accommodating the driving disc and disposed rotatably on the rotary shaft, a torque transmitting chamber for incorporating the driving disc therein and an oil reserving chamber for reserving oil which are formed in the sealed case thus constituting a mechanism where oil is supplied to the inside of the torque transmitting chamber from the oil reserving chamber so as to transmit a driving torque of the driving disc to the sealed case, a discharge passage which sends oil supplied to the torque transmitting chamber through a dam mechanism formed in an inner peripheral surface of the sealed case to the oil reserving chamber from the torque transmitting chamber, a partition plate which is provided with a flow-out adjusting hole for oil which makes the oil reserving chamber and the torque transmitting chamber communicate with each other, and a valve member disposed in the inside of the oil reserving chamber, wherein the flow-out adjusting hole is opened or closed in response to the deformation of the valve member caused by the change of temperature of a temperature sensitive body made of a bimetal which is disposed outside of the oil reserving chamber side of the sealed case, the improvement is characterized in that in the inside of the torque transmitting chamber, a movable disc which faces the driving disc disposed in the inside of the torque transmitting chamber with a gap therebetween is resiliently supported in such a manner that the gap can be varied, an electromagnet which is disposed at a position outside of the movable disc side of the sealed case where the electromagnet faces the movable disc and attracts the movable disc is supported on the rotary shaft, whereby the gap between the driving disc and the movable disc is varied by the electromagnet.

The first and second aspects of the present invention are also characterized in that a plurality of pins which protrude in an axial direction are mounted on the inner surface of the sealed case and the distal end portions of the pins are slidably fitted into holes formed in the movable disc.

In the present invention, by narrowing the gap between the driving disc and the movable disc, the driving torque can be increased, while, as an opposite case, by widening the gap between the driving disc and the movable disc, the driving torque is decreased. Accordingly, at the time of restarting an engine after stopping the engine or at the time of rapid acceleration during operation under the condition that a large amount of oil is present in the torque transmitting chamber, by widening the gap between the driving disc and the movable disc, 'the drag phenomenon' can be prevented. Furthermore, at the time of performing operations other than the above-mentioned restarting or the rapid acceleration, the rotational speed of the fan can be arbitrarily controlled by controlling an electric current supplied to the electromagnet by means of a computer mounted on a vehicle in response to the temperature of engine cooling water, the travelling speed of the vehicle, the degree of opening of acceleration or others (the gear ratio, the rotational speed of the fan, the outside temperature and the like).

BRIEF DESCRIPTION OF THE DRAWING

The accompanying drawings which are incorporated in and constitute a part of this specification, illustrate several embodiments of the invention and, together with the description, serve to explain the principles of this invention.

DETAILED DESCRIPTION OF PREFERRED EMBODIMENTS

Figure 1:
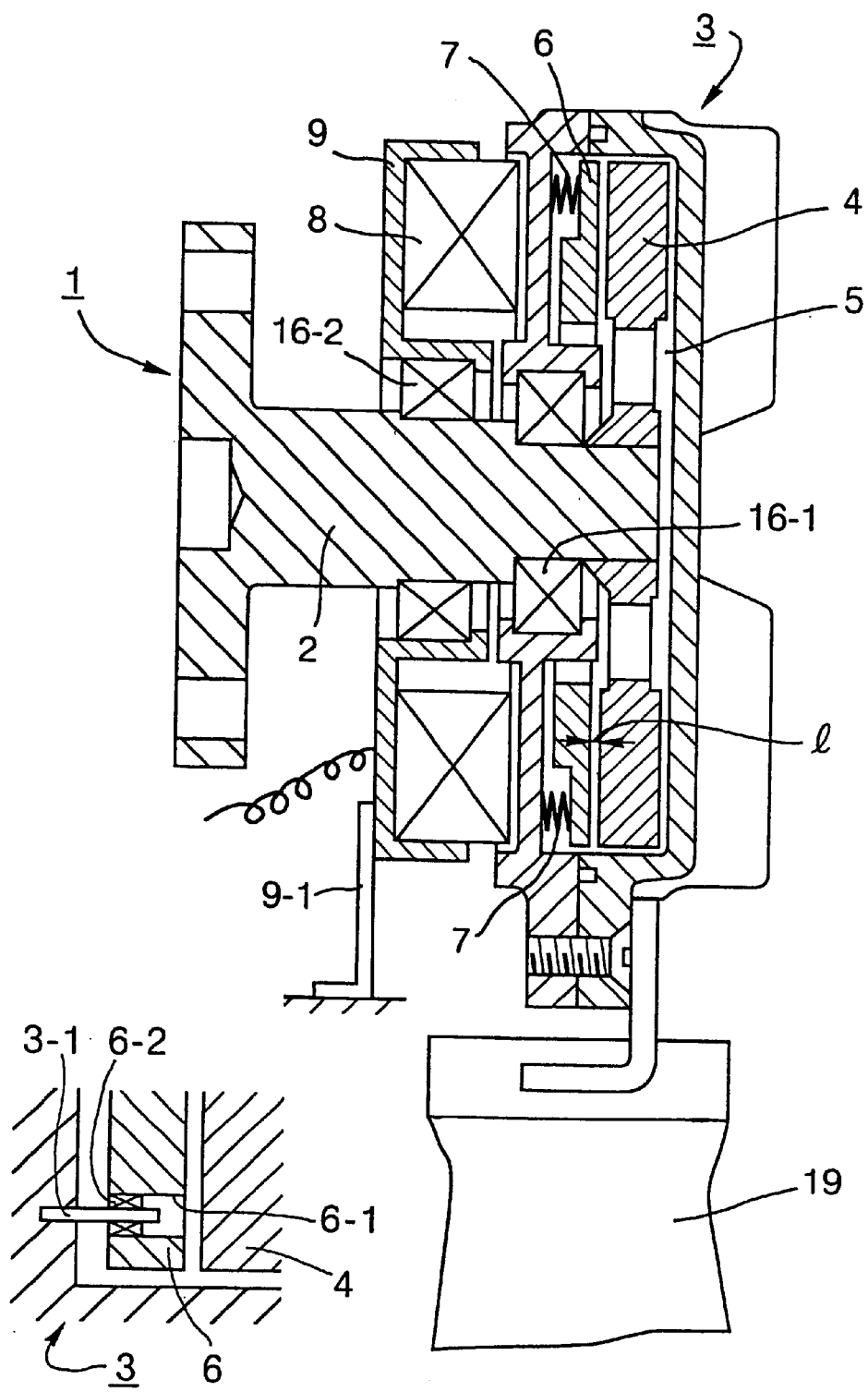
FIG. 1 is a view showing one embodiment of a fluid clutch of the present invention, wherein (a) is a longitudinal cross sectional side view and (b) is an enlarged longitudinal cross sectional view as seen from a different viewing angle.
Figure 2:
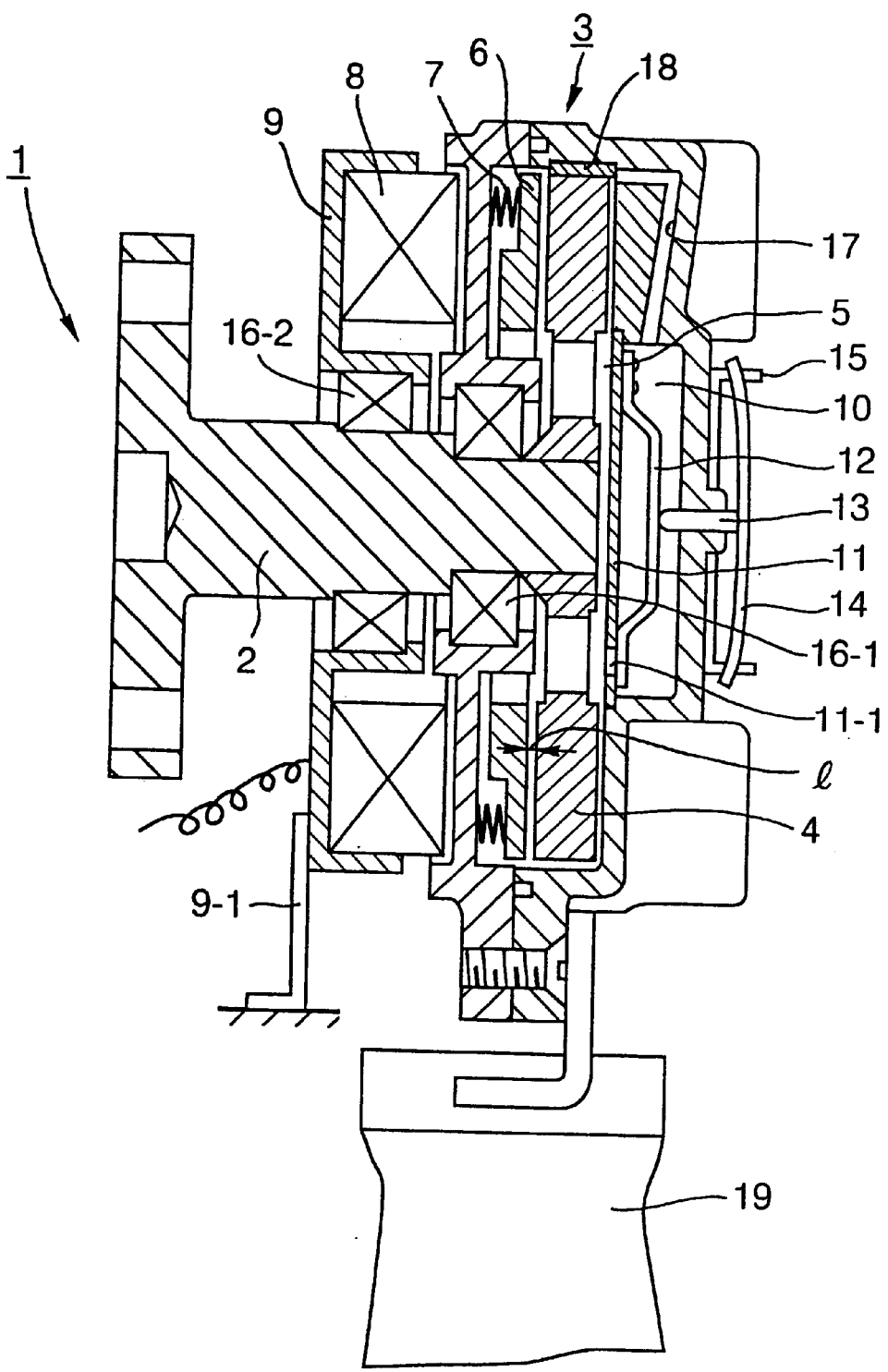
FIG. 2 is a longitudinal cross sectional seide view showing one embodiment of a fluid clutch (temperature sensitive type) of the present invention.
Figure 3:
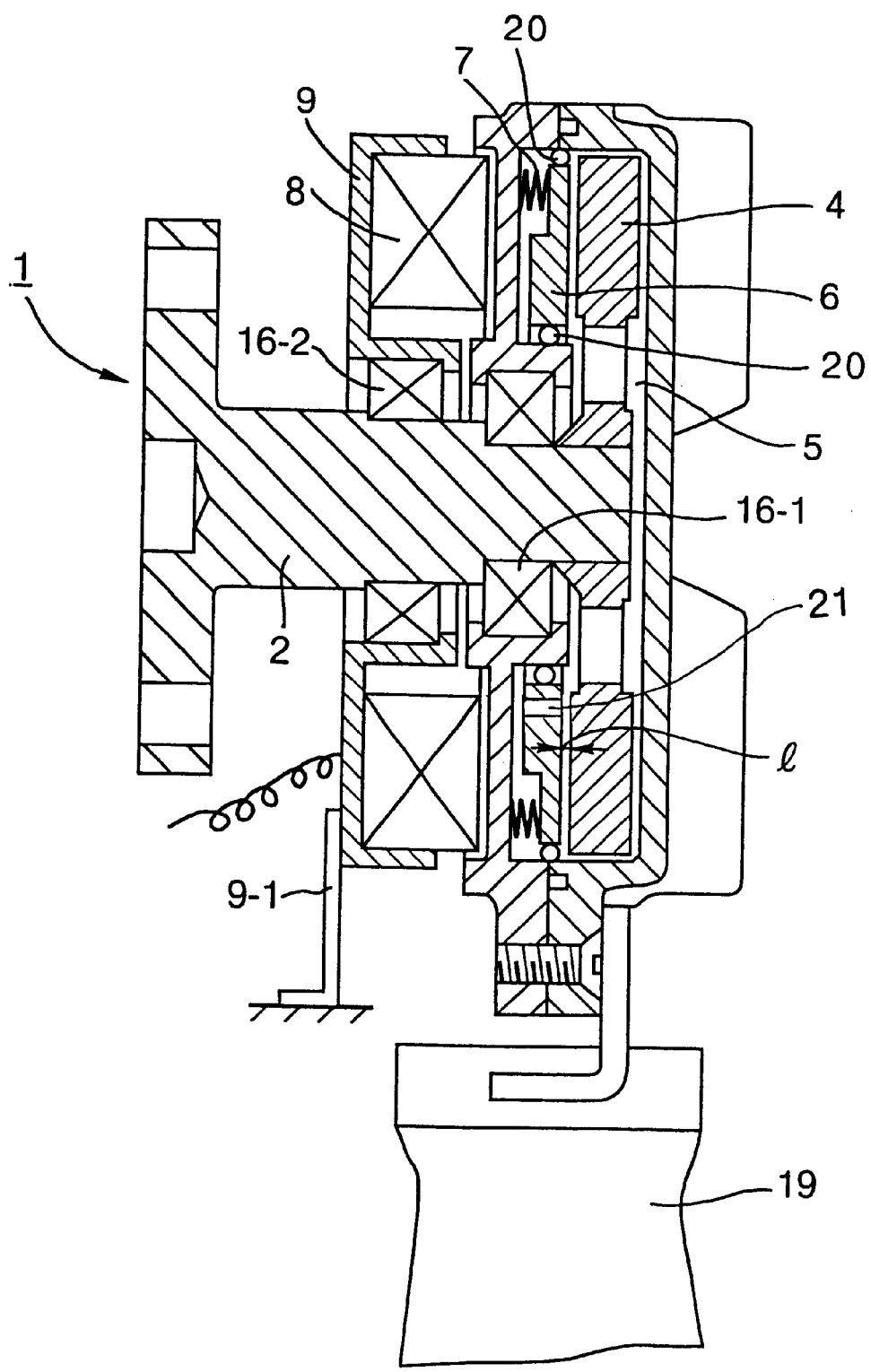
FIG. 3 is a longitudinal cross sectional side view showing other embodiment of the present invention.

In FIG. 1 to FIG. 3, numeral 1 indicates a driving part, numeral 2 indicates a rotary shaft, numeral 3 indicates a sealed case, numeral 4 indicates a driving disc, numeral 5 indicates a torque transmitting chamber, numeral 6 indicates a movable disc, numeral 7 indicates springs, numeral 8 indicates an electromagnet, numeral 9 indicates a magnet support body, numeral 10 indicates an oil reserving chamber, numeral 11 indicates a partition plate, numeral 11-1 indicates a flow-out adjusting hole, numeral 12 indicates a valve member, numeral 13 indicates a piston rod, numeral 14 indicates a strip-like bimetal, numeral 15 indicates a bracket, numerals 16-1 and 16-2 indicate bearings, numeral 17 indicates a discharge passage, numeral 18 indicates a dam, numeral 19 indicates a cooling fan, and numeral 20 indicates a sealing member.

That is, in the fluid clutch of the present invention shown in FIG. 1, on the rotary shaft 2 which is rotated upon driving of the driving part (engine) 1, the sealed case 3 having a large diameter and a short length is rotatably mounted by way of the bearing 16-1. The torque transmitting chamber 5 is formed in the inside of the case 3. In the torque transmitting chamber 5, the disc-like driving disc 4 which is fixedly mounted on the end portion of the rotary shaft 2 and the donut-shaped movable disc 6 which faces one side of the driving disc 4 and is resiliently supported by means of springs 7 (that is, supported in such a manner that the movable disc 6 is biased toward the driving disc 4) are disposed. The driving disc 4 is accommodated in such a manner that torque transmitting gaps are formed between the driving disc 4 and the inner peripheral surface of the torque transmitting chamber 5 and between the driving disc 4 and the movable disc 6. The gap l between the driving disc 4 and the movable disc 6 is varied in response to an action of the spring 7. Furthermore, at the outside of the movable disc 6 side of the sealed case 3, the electromagnet 8 which is supported by the magnet support body 9 is supported on the rotary shaft 2 by way of the bearing 16-2 such that the electromagnet 8 faces the movable disc 6 and the electromagnet 8 is rotatable relative to the rotary shaft 2. The magnet support body 9 is fixedly secured to an outside by means of the bracket 9-1. Although springs may be generally used as means for resiliently supporting the movable disc 6, rubber-made or resin-made support members may be used.

Furthermore, in the fluid clutch having the constitution shown in FIG. 1, the driving torque of the driving disc 4 is transmitted to the sealed case 3 by oil supplied to the torque transmitting chamber 5 and hence, the cooling fan 19 mounted on the sealed case 3 is rotated. At this time of the operation, the electromagnet 8 is held at the OFF state and the width $\Delta l_1$ of the gap l between the driving disc 4 and the movable disc 6 is usually set to approximately 0.5 mm and hence, a large driving torque is obtained. Subsequently, when the electromagnet 8 is turned on, the movable disc 6 is attracted so that the gap l between the driving disc 4 and the movable disc 6 is widened. Accordingly, the driving torque is decreased and the rotational speed of the sealed case 3 is decreased and hence, the cooling fan 19 is decelerated. The maximum width $\Delta l_2$ of the gap l between the driving disc 4 and the movable disc 6 in case the electromagnet 8 is at the ON state is usually equal to or more than 1.2–1.3 mm. Furthermore, within a control range from the OFF state to the ON state of the electromagnet 8, the electric current supplied to the electromagnet 8 may be subjected to the duty control and hence, the cooling fan 19 may be controlled to a desired rotational speed. In controlling the cooling fan 19 to the desired rotational speed, the temperature of the engine cooling water, the travelling speed of a vehicle, the degree of opening of the acceleration or others (the gear ratio, the rotational speed of the fan, the outside temperature and the like) are inputted to the computer mounted on the vehicle and the electricity which is supplied to the electromagnet 8 is controlled based on the judgment of the computer.

Accordingly, even when a large amount of oil is present in the inside of the torque transmitting chamber 5, by merely turning on the electromagnet 8 at the time of restarting or at the time of rapid acceleration during operation, the rotational speed of the cooling fan 19 can be reduced and hence, 'the drag phenomenon' can be prevented and furthermore, the noise is reduced and the unnecessary fuel consumption can be prevented.

Furthermore, it is preferable to provide a reaction receiving structure shown in FIG. 1(b) for ensuring the function of preventing the movable disc 6 from being dragged or attendingly rotated along with the rotation of the driving disc 4 due to the viscosity of oil and the function of preventing the movable disc 6 from tilting, that is, to maintain the parallelism of the movable disc 6 to the driving disc 4 firmly and constantly. That is, a plurality of pins 3-1 which protrude in an axial direction are mounted on the inner surface of the sealed case 3 and free end portions of the pins are slidably fitted into holes 6-1 formed in the movable disc 6 by way of bearings 6-2. Here, it is preferable that the number of the pins 3-1 is set such that at least three pins 3-1 are arranged in a circumferentially spaced-apart manner while avoiding positions of the springs 7 in view of the reason for providing pins 3-1.

Subsequently, in a fluid clutch shown in FIG. 2, on the rotary shaft 2 which is rotated upon driving of the driving part (engine) 1, the sealed case 3 having a large diameter and a short length is rotatably mounted by way of the bearing 16-1. The inside of this sealed case 3 is divided into the torque transmitting chamber 5 and the oil reserving chamber 10 by means of the partition plate 11. In the inside of the torque transmitting chamber 5, as in FIG. 1 the disc-like driving disc 4 which is fixedly mounted on the end portion of the rotary shaft 2 and the donut-shaped movable disc 6 which faces one side of the driving disc 4 and is resiliently supported by means of springs 7 are disposed. The driving disc 4 is accommodated in such a manner that torque transmitting gaps are formed between the driving disc 4 and the inner peripheral surface of the torque transmitting chamber 5 and between the driving disc 4 and the movable disc 6. The gap l between the driving disc 4 and the movable disc 6 can be varied in response to an action of the spring 7. Furthermore, as in the previously mentioned embodiment, at the outside of the movable disc 6 side of the sealed case 3, the electromagnet 8 which is supported by the magnet support body 9 is supported on the rotary shaft 2 by way of the bearing 16-2 such that the electromagnet 8 faces the movable disc 6 and the electromagnet 8 is rotatable relative to the rotary shaft 2. The magnet support body 9 is fixedly secured to an outside by means of the bracket 9-1.

Furthermore, the fluid clutch shown in FIG. 2 is constituted such that oil in the oil reserving chamber 10 is supplied to the torque transmitting chamber 5 through the flow-out adjusting hole 11-1 formed in the partition plate 11. The torque transmitting chamber 5 and the oil reserving chamber 10 form a circulating passage by means of the flow-out adjusting hole 11-1 formed in the partition plate 11 and the discharge passage 17. To ensure the smooth flowing out of oil from the torque transmitting chamber 5 to the oil reserving chamber 10, the dam 18 is formed in the vicinity of an inlet of the discharge passage 17 on the inner peripheral surface of the sealed case 3. The cooling fan 19 is mounted on the outside of the sealed case 3.

On the other hand, the valve member 12 has one end thereof fixedly secured to the partition plate 11 disposed in the inside of the oil reserving chamber 10 and the other end thereof disposed in the oil reserving chamber 10 such that the other end covers the flow-out adjusting hole 11-1. This valve member 12 is mounted on the partition plate 11 such that the valve member 12 is operated by a piston rod 13 which has an inner end thereof brought into contact with an approximately central portion of the valve member 12 and an outer end thereof brought into contact with a strip-like bimetal 14 disposed on the outside of the oil reserving chamber 10 by way of a bracket 15. That is, a mechanism is provided where the valve member 12 opens or closes the flow-out adjusting hole 11-1 formed in the partition plate 11 in an interlocking manner with the curved deformation of the strip-shaped bimetal 14 caused by the temperature change. Although the illustrated embodiment is explained with the bimetal having a strip-like shape, it is needless to say that the present invention can adopt conventional known spirally-shaped bimetal.

Furthermore, in the fluid clutch having the constitution shown in FIG. 2, the driving torque of the driving disc 4 is transmitted to the sealed case 3 by supplying oil in the oil reserving chamber 10 to the torque transmitting chamber 5 through the flow-out adjusting hole 11-1 of the partition plate 11 and hence, the cooling fan 19 mounted on the sealed case 3 is rotated. In this embodiment, as in the case of the fluid clutch shown in FIG. 1, in case the electromagnet 8 is held at the OFF state, the width $\Delta l_1$ of the gap l between the driving disc 4 and the movable disc 6 is narrow, that is, approximately 0.5 mm and hence, a large driving torque is obtained. Subsequently, when the electromagnet 8 is turned on, the movable disc 6 is attracted so that the maximum width $\Delta l_2$ of the gap l between the driving disc 4 and the movable disc 6 is widened equal to or more than 1.2–1.3 mm. Accordingly, the driving torque is decreased and the rotational speed of the sealed case 3 is decreased and hence, the cooling fan 19 is decelerated. Furthermore, within a control range from the OFF state to the ON state of the electromagnet 8, as in the case of the previous embodiment, by inputting the temperature of the engine cooling water, the travelling speed of a vehicle, the degree of opening of the acceleration or others (the gear ratio, the rotational speed of the fan, the outside temperature) to the computer mounted on the vehicle and then performing the duty control on the electricity which is supplied to the electromagnet 8 based on the judgment of the computer, the cooling fan 19 can be controlled to a desired rotational speed.

Accordingly, even when a large amount of oil is present in the inside of the torque transmitting chamber 5, by merely turning on the electromagnet 8 at the time of restarting or at the time of rapid acceleration during operation, the rotational speed of the cooling fan 19 can be reduced and hence, 'the drag phenomenon' can be prevented and furthermore, the noise is reduced and the unnecessary fuel consumption can be prevented.

Furthermore, since the fluid clutch having the constitution shown in FIG. 2 is of a temperature sensitive type, in case the temperature of outdoor air which passes through the radiator is high, a strip-shaped bimetal 14 is deformed in a convex form and the valve member 12 is pulled upwardly by way of the piston rod 13 and hence, the flow-out adjusting hole 11-1 of the partition plate 11 is opened and the oil in the oil reserving chamber 10 is supplied to the torque transmitting chamber 5. Corresponding to the increase of an amount of oil supplied to the torque transmitting chamber 5, the torque transmitting efficiency by oil in the torque transmitting chamber 5 is enhanced and hence, the rotational speed of the sealed case 3 is elevated and the cooling fan 19 is accelerated.

To the contrary, in case the outside temperature is low, the strip-shaped bimetal 14 pushes the valve member 12 by way of the piston rod 13, the flow-out adjusting hole 11-1 of the partition plate 11 is closed so as to stop the supply of oil from the oil reserving chamber 10 to the torque transmitting chamber 5 and to return the oil in the inside of the torque transmitting chamber 5 to the oil reserving chamber 10 by means of the dam 18 by way of the discharge passage 17. Accordingly, the torque transmitting efficiency is lowered and the rotational speed of the sealed case 3 is decreased so that the cooling fan 19 is decelerated.

Accordingly, in case of the liquid clutch of the temperature sensitive type, at the time of performing the normal operation, as mentioned previously, following the deformation of the bimetal 14 caused by the elevation and lowering of the outside temperature, the valve member 12 opens or closes the flow-out adjusting hole 11-1 so as to control the torque transmission. At the time of restarting the engine and at the time of rapid acceleration during operation where a large amount of oil is present in the torque transmitting chamber 5, by controlling the gap l between the driving disc 4 and the movable disc 6 by moving the movable disc 6, 'the drag phenomenon' can be effectively prevented and the noise of the fan is largely reduced and the fuel consumption is greatly reduced.

In case of the fluid clutch shown in FIG. 2, it is sufficient for the bracket 9-1 which fixedly secures the magnet supporting body 9 to the outside to have a rigidity which can prevent the rotation of the electromagnet 8 along with the rotation of the sealed case 3 by the magnetic force of the electromagnet 8.

On the other hand, by fixedly securing the magnet supporting body 9 to the outside with the bracket 9-1 having the rigidity which can sufficiently ensure the concentricity of the electromagnet 8 relative to the rotary shaft 2, the bearing 16-2 may be omitted from the fluid clutch shown in FIG. 2.

Furthermore, a fluid clutch shown in FIG. 3 is characterized in that a seal member 20 such as an O ring is disposed in a gap portion defined between the inner wall of the sealed case 3 and the outer peripheral end and the inner peripheral end of the movable disc 6 and an air bleed hole 21 is formed for preventing the elevation of the pressure in a space surrounded by the seal member 20, the movable disc 6 and the inner wall of the sealed case 3 in the fluid clutch shown in FIG. 1, for example.

According to the constitution shown in FIG. 3, the gap l between the driving disc 4 and the movable disc 6 can be controlled and the contact area between oil which constitutes an essential parameter of the torque transmission and the driving disc 4 can be varied by changing the capacity of the torque transmitting chamber 5 so as to bring about a greater effect.

Besides using the seal member 20, the outer peripheral surface and the inner peripheral surface of the movable disc 6 may be brought into slide contact with the inner wall surface of the sealed case 3. Furthermore, it is preferable to provide pins 3-1 shown in FIG. 1(b) to the embodiments shown in FIG. 2 and FIG. 3.

As has been described heretofore, the fluid clutch according to the present invention incorporates the movable disc which faces the driving disc in an opposed manner in the torque transmitting chamber and has a function of adjusting the gap between the movable disc and the driving disc by moving the movable disc by means of the electromagnet. Accordingly, excellent effects that even when a large amount of oil is present in the torque transmitting chamber, 'the drag phenomenon' which occurs at the time of restarting or at the time of rapid acceleration can be effectively prevented and the rotational speed of the cooling fan can be controlled in response to various driving conditions so that the noise of fan can be reduced and the lowering of the fuel consumption is enhanced and the accelerating performance is enhanced are obtained.

What is claimed is:

1. A fluid clutch including a driving part, a rotary shaft rotated by said driving part, a driving disc rotatably driven by said rotary shaft, a sealed case accommodating said driving disc and disposed rotatably on said rotary shaft, and a torque transmitting chamber formed in said sealed case and incorporating said driving disc therein, wherein a driving torque of said driving disc is transmitted to said sealed case by oil supplied to the inside of said torque transmitting chamber, the improvement being characterized in that in the inside of said torque transmitting chamber, a movable disc which faces said driving disc disposed in the inside of said torque transmitting chamber with a gap therebetween is resiliently supported in such a manner that said gap can be varied, an electromagnet which is disposed at a position outside of said movable disc side of said sealed case where said electromagnet faces said movable disc and attracts said movable disc is provided, whereby said gap between said driving disc and said movable disc is varied by said electromagnet.

2. A fluid clutch according to claim 1, wherein a plurality of pins which protrude in an axial direction are mounted on an inner surface of said sealed case and free end portions of said pins are slidably fitted into holes formed in said movable disc.

3. A fluid clutch according to claim 1, wherein mean for variably and resiliently supporting said movable disc is one selected from a group consisting of a spring, a rubber-made support body and a resin-made support body.

4. A fluid clutch according to claim 1, wherein an electric current supplied to said electromagnet is subjected to a duty control.

5. A fluid clutch according to claim 1, wherein an electric current supplied to said electromagnet is controlled by a computer.

6. A fluid clutch including a driving part, a rotary shaft rotated by said driving part, a driving disc rotatably driven by said rotary shaft, a sealed case accommodating said driving disc and disposed rotatably on said rotary shaft, and a torque transmitting chamber for incorporating said driving disc therein and an oil reserving chamber for reserving oil which are formed in said sealed case thus constituting a mechanism where oil is supplied to the inside of said torque transmitting chamber from said oil reserving chamber so as to transmit a driving torque of said driving disc to said sealed case, a discharge passage which sends oil supplied to said torque transmitting chamber through a dam mechanism formed in an inner peripheral surface of said sealed case to said oil reserving chamber from said torque transmitting chamber, a partition plate which is provided with a flow-out adjusting hole for oil which makes said oil reserving chamber and said torque transmitting chamber communicate with each other, and a valve member disposed in the inside of said oil reserving chamber, wherein said flow-out adjusting hole is opened or closed in response to the deformation of said valve member caused by the change of temperature of a temperature sensitive body made of a bimetal which is disposed outside of the oil reserving chamber side of said sealed case, the improvement being characterized in that in the inside of said torque transmitting chamber, a movable disc which faces said driving disc disposed in the inside of said torque transmitting chamber with a gap therebetween is resiliently supported in such a manner that said gap can be varied, an electromagnet which is disposed outside of the movable disc side of said sealed case at a position where said electromagnet faces said movable disc and attracts said movable disc is provided, whereby said gap between said driving disc and said movable disc is varied by said electromagnet.

7. A fluid clutch according to claim 6, wherein a plurality of pins which protrude in an axial direction are mounted on an inner surface of said sealed case and free end portions of said pins are slidably fitted into holes formed in said movable disc.

8. A fluid clutch according to claim 6, wherein mean for changeably and resiliently supporting said movable disc is one selected from a group consisting of a spring, a rubber-made support body and a resin-made support body.

9. A fluid clutch according to claim 6, wherein an electric current supplied to said electromagnet is subjected to a duty control.

10. A fluid clutch according to claim 6, wherein an electric current supplied to said electromagnet is controlled by a computer.

11. A fluid clutch according to claim 6, wherein said bimetal is formed in a strip shape or a spiral shape.

12. A fluid clutch according to claim 6, wherein seal means is disposed in a gap portion between the inner wall of said sealed case and an outer peripheral end and an inner peripheral end of said driving disc.

13. A fluid clutch according to claim 12, wherein said fluid clutch is further provided with ventilating means through which a space surrounded by said seal means, said movable disc and an inner wall of said sealed case is communicated with outside air.

* * * * *